United States Patent [19]
Specht et al.

[11] 3,834,518
[45] Sept. 10, 1974

[54] ELECTRICAL CONDUCTOR ELEMENT FOR CHECKING POSSIBLE DAMAGE TO CONVEYOR BELTS, AND CONVEYOR BELT EQUIPPED WITH SUCH CONDUCTOR ELEMENT

[75] Inventors: Hans Specht, Northeim; Bruno Kroll, Ronnenberg; Alfred Grüttner, Harenberg, all of Germany

[73] Assignee: Continental Gummi-Werke Aktiengesellschaft, Hannover, Germany

[22] Filed: Oct. 2, 1973

[21] Appl. No.: 402,748

[52] U.S. Cl............. 198/40, 57/142, 57/159, 174/90, 174/128, 198/193, 198/232, 340/259
[51] Int. Cl...... B65g 15/30, H01b 5/08, B65g 43/02
[58] Field of Search.......... 174/68 R, 70 R, 90, 128, 174/130, 131 R, 131 A; 29/461; 57/141, 142, 158, 159; 74/231 R, 237; 140/111; 198/40, 193, 232; 340/259

[56] References Cited
UNITED STATES PATENTS

| | | | |
|---|---|---|---|
| 190,823 | 5/1877 | Channon | 57/159 |
| 345,719 | 7/1886 | Nash | 57/159 |
| 439,583 | 10/1890 | Verrill | 57/159 |
| 3,602,360 | 8/1971 | Halbach et al. | 198/40 |
| 3,636,436 | 1/1972 | Kurauchi et al. | 340/259 X |
| 3,731,113 | 5/1973 | Lowe | 198/40 X |
| 3,731,786 | 5/1973 | Nagata et al. | 198/40 |
| 3,742,477 | 6/1973 | Enabnit | 198/232 X |
| 3,792,459 | 2/1974 | Snyder | 340/259 |

FOREIGN PATENTS OR APPLICATIONS

| | | | |
|---|---|---|---|
| 2,018,986 | 11/1971 | Germany | 198/193 |

*Primary Examiner*—Laramie E. Askin
*Attorney, Agent, or Firm*—Walter Becker

[57] ABSTRACT

An electric conductor element for insertion into a conveyor belt for checking possible damage thereto, such as slits and cracks, which includes a metallic wire cable comprising a plurality of wire strands and being shaped in the form of a loop while having its ends spliced together over a length of from one-twentieth to approximately one-tenth of the circumference of the finished loop. The spliced strand ends are twisted to each other and protrude laterally from the remainder of the conductor element. The invention also includes a conveyor belt of elastomeric material having reinforcing strength carriers extending in the longitudinal direction of the belt and spaced from each other in a direction transverse to the longitudinal direction of the belt, while a plurality of loop-shaped conductor elements of the above-mentioned type are imbedded in the belt and located in a plane at least approximately parallel to the surface of the belt and in spaced relationship to the strength carriers, said loop-shaped conductor elements being distributed over the length of the belt in spaced relationship to each other.

10 Claims, 5 Drawing Figures

ELECTRICAL CONDUCTOR ELEMENT FOR CHECKING POSSIBLE DAMAGE TO CONVEYOR BELTS, AND CONVEYOR BELT EQUIPPED WITH SUCH CONDUCTOR ELEMENT

The present invention relates to conveyor belts having reinforcing inserts and means for checking breaks in the conveyor belt. More specifically, the present invention concerns conveyor belts as just set forth with electric conductor elements in the form of endless loops made of a metal wire cable and imbedded in the conveyor belt in a plane substantially parallel to the surface of the belt, and spaced from the reinforcing inserts in the belt.

According to heretofore known suggestions, the current flow generated inductively in the loops is employed for continuously checking the moved conveyor belt and early to ascertain damages which may have been caused by foreign bodies that have entered the belt. Inasmuch as in case of damage the pulses acting upon the belt drive are generated by interruptions in the conductor, the construction and the endless connection of the current loops are of great importance.

Breaks in the wire resulting from high dynamic stresses of the loops during the rotation of the belt around the drums, in the trough-shaped conveying section and also under the influence of the impact of the material to be conveyed at the charging stations, lead to faulty indications and interruptions of the conveyor belt operation. In this respect, the connecting area itself is particularly in danger because, in spite of all heretofore employed care, it will fail even earlier than the wires, and in response to high pulling forces tends to pull apart the conductor ends. In addition thereto, it is to be noted that also the transfer resistance between the conductor ends frequently exceeds the response threshold and due to non-controllable changes in shape reaches the critical value, so that without causes which could be recognized from the outside, faulty operations would be initiated.

It is, therefore, an object of the present invention to eliminate the causes of such current interruptions simulated by untimely control pulses, and to provide an endless connection of the conductor loops which will meet the dynamic requirements also in high strength conveyor belts.

These and other objects and advantages of the present invention will appear more clearly from the following specification in connection with the accompanying drawings, in which.

The electric conductor element according to the present invention is characterized primarily in that the conductor element is made of multiple wire strands, and by means of a long splice having a length of at least one-twentieth to approximately one-tenth of the loop circumference, is endlessly connected to strand ends which are twisted with each other and protrude from the splice in spaced relationship to each other.

Expediently, the strand ends, at least 10 of which may be distributed over the length of the splice, are reduced to a length, counting from the outer circumference of the conductor element, in the magnitude of the element diameter or of twice or more of the above-mentioned value.

For a further improvement of the positive adherence of the loops, it is suggested to provide the loops with a brass cover which is applied galvanically or in any other suitable manner after the long splice has been prepared, and as the case may be, the loops may also, directly prior to their installation in the lower protion of the belt, be provided with a coat of solvents which aid in establishing an adherence.

The splicing of the loop ends requires a multi-strand construction of the conductor elements, which means that also the mantle strands twisted together over a core are respectively composed of, for instance, three individual strands loosely twisted together.

Figure 1:
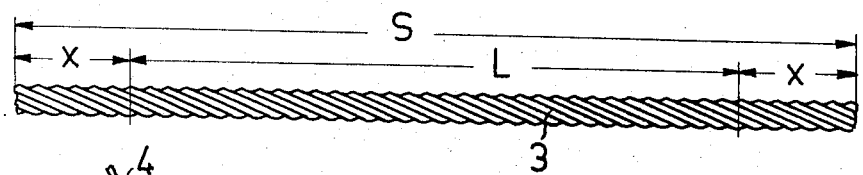
FIG. 1 illustrates the dimensional relation in a conductor element prepared for splicing.
Figure 2:
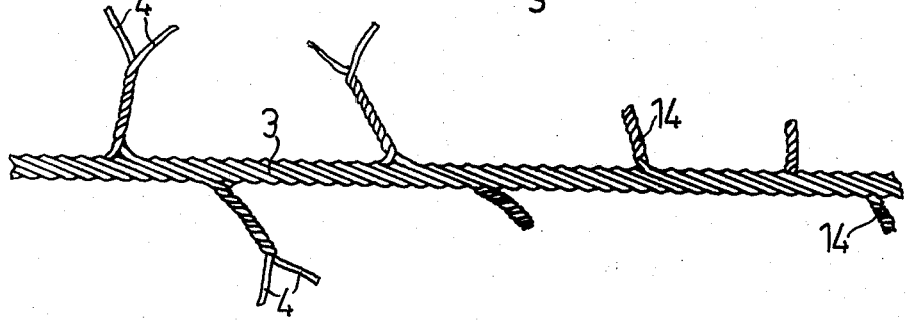
FIG. 2 shows a partial section of the longitudinal splice on a scale somewhat larger than the scale of FIG. 1.

Referring now to the drawings and FIGS. 1 and 2 thereof in particular, the installation of the finished conductor loops into the conveyor belt and their functions within the conveying device are known. As to the manufacture of conductor loops of the above-mentioned longitudinal dimensions, such manufacture is based on the conductor elements 3. These conductor elements 3 are advantageously composed of tin-plated copper wire. According to the preferred embodiment of the invention, six mantle strands respectively comprising three individual strands loosely twisted together are twisted with a similarly produced core strand. The reference character L in FIG. 1 is intended to indicate the circumferential length of the finished endless loops, whereas the character S designates the starting length. Therefore, counting from both ends of the longitudinal splice, longitudinal sections of the same magnitude are employed for the longitudinal splice, the longitudinal sections are designated with the character X indicating substantially the length of the splice connection.

For purposes of preparing the endless connection, the ends of the conductor elements 3 are over the longitudinal range X divided up into their individual components and, starting with the core, the parts which are associated with each other and are located opposite each other are twisted together. The strands 4 which are twisted to each other outside the conductor element are, in conformity with FIG. 2, cut off to a length of from a few millimeters to a centimeter so that they will project from the circumference of the conductor in the form of short ends 14 while being spaced from each other. After the long splice has been completed, the endless conductor loop is brass-plated and is thus ready for installation in the conveyor belt.

The endless connection of conductor loops made in conformity with the above outlined manner of the invention will meet all requirements of the conveyor operation, not only with regard to its dynamic power but also with regard to pull resistance and its electrical properties. Over a welded or sleeve connection and other steps which affect the flexibility in the connecting range, the splicing of the conductor ends has the advantage that a practically uniform bending ability will be obtained without a reinforcing zone which is liable to continuous breaks. The unusual length of the splicing arrangement creates favorable conditions for an undisturbed current passage, which is maintained under all circumstances, while the transfer resistance is negligibly low. Moreover, high pull resistance and resistance against a pulling apart of the strand ends will be assured. The distribution of the strand ends which are twisted with each other, over such wide range of the entire loop circumference, furnishes the possibility to prepare the long splice while avoiding harmful local accumulations of thicknesses, while the longitudinal splice will have substantially the thickness of the conductor elements in the remaining length ranges. The strand ends which protrude from the strand proper and are shortened to a practical length act within the belt body as positive connecting anchors which additionally fix the loops against any displacement in the elastomeric imbedding material.

Figure 3:
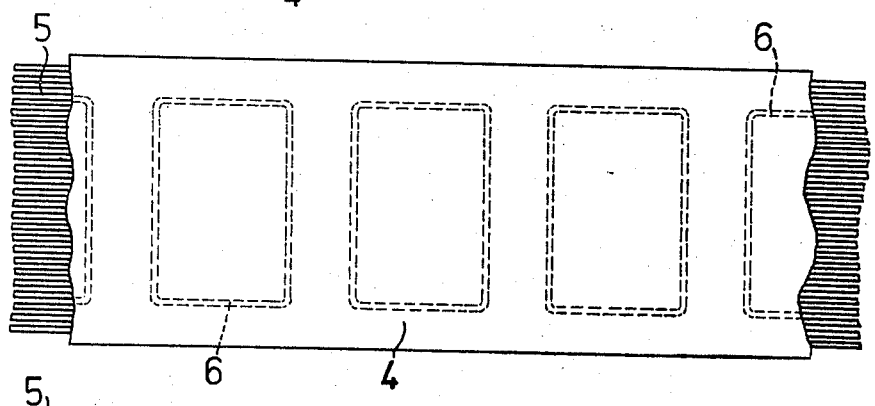
FIG. 3 illustrates a top view of a section of a conveyor belt indicating the way in which conductor loops are imbedded.
Figure 4:
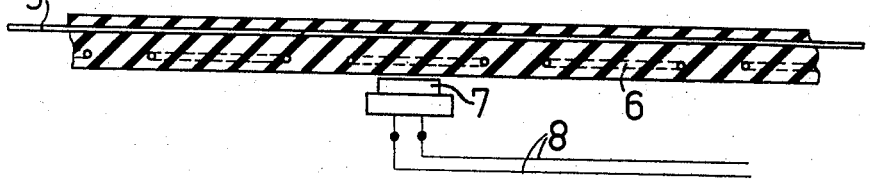
FIG. 4 is a longitudinal section through the belt section of FIG. 3.
Figure 5:
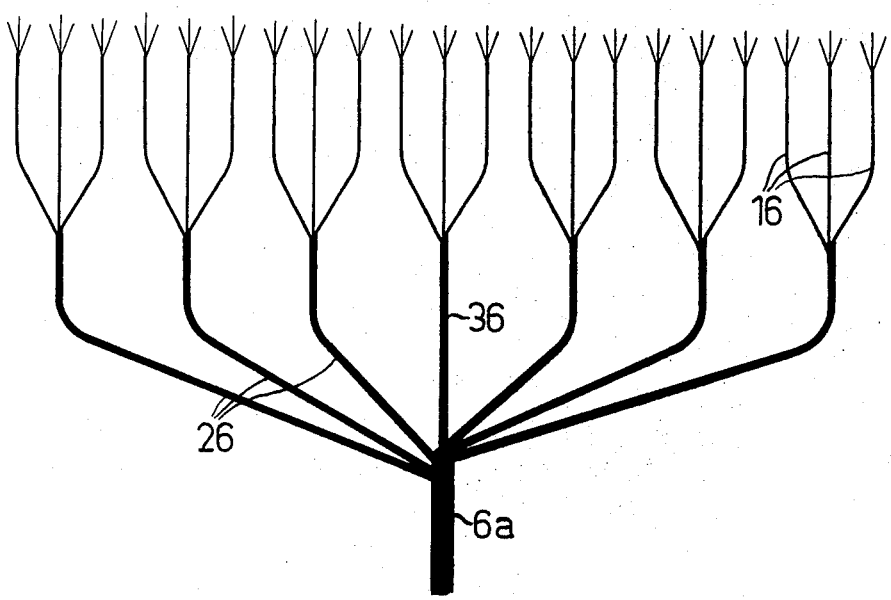
FIG. 5 illustrates a diagram for the construction of a conductor element for preparing the conductor loops.

Referring now to FIGS. 3 – 5, the construction illustrated therein concerns conveyor belts with cables or the like imbedded therein in spaced relationship to each other and also with a plurality of flexible conductors distributed over the length of the belt and imbedded therein, said conductors being flexible and joined at their ends.

These conductors form closed conductor loops or rings which are checked as to damage or as to whether they are intact by scanning means which are stationary relative to the moving belt. This scanning is preferably effected in a contact-free manner.

The imbedded conductor loops serve in a manner known per se for indicating longitudinally extending separating areas in the conveyor belt, as for instance slits or breaks caused by foreign bodies which have entered the belt. It is a well-known fact that such breaks may cause considerable damage, especially in so-called steel cable conveyor belts which have no transverse inserts. As the conductor loops acting as coreless coils and moved together with the driven conveyor belt past a stationary sender, alternating voltage is induced, which in its turn acts upon a stationary receiver. If, however, the conductor loop is broken due to a slit or split in the belt body, the alternating current field cannot be generated, so that the receiver after failure of the expected influence will initiate a warning signal or a pulse for stopping the belt drive. Checking devices of this type are known and in part are also used with good success. In all instances, the conductor loops form an important element of function because the reliability of the safety system, and thus the economy of the entire conveyor installation, depends to a major extent on the property of the conductor loops. While on one hand the good electrical conductivity is of foremost importance and makes the use of metallic wires mandatory, on the other hand there exists the requirement of a highly dynamic loadability of the conductor loops which continuously and alternately are subjected to bending stresses, pulling stresses, and upsetting during the circulation of the conveyor belt about the driving drums, with the changes in shape caused by the troughing in the tight section of the belt, and finally also by the impact of the material to be conveyed within the region of the charged stations. Premature wiring breaks in the conductor loops bring about faulty indications and expensive stopping of the conveyor operation. This danger cannot be met merely by a reinforcement in the conductor loops, if the sensitivity of response and actually occurring damage is not to be affected in an inadmissible manner. According to the invention, the connecting area of the endless conductor loops represents a source of particularly frequent disorders because, in spite of the customarily employed diligence, this area yields earlier than the wires themselves in view of the high pull force and may initiate faulty operations by pulling the wire ends apart. The reliability of the safety system, while maintaining a high sensitivity of response and eliminating the danger of faulty indications as well as the life of the endless connections of the belt, is greatly increased according to the present invention. To this end, the conductor loops of a plurality of outer strands which are made of round copper wire produced in a three-stage twisting operation and are loosely twisted about a similarly built-up core strand, are formed with a total diameter corresponding to from 40 to 50 times the wire diameter. Expediently, six outer strands respectively built up of three individual strands are arranged above a continuous core strand, while the individual strand may again comprise from 25 to 40 copper wires.

This construction represents a favorable compromise between the requirements for good electric conductivity on one hand and dynamic behavior which remains the same practically over unlimited time periods, which, in addition to good strength, means sufficient electricity, and deformability without premature fatiguing breaks. Although copper as wire material was heretofore, due to its fatiguing resistance, not considered to meet dynamic stresses, and while for the manufacture of conductor loops, exclusively steel wire or wires drawn of other highly resistant materials were considered suitable, it has been possible with the construction according to the present invention, against all expectation, to employ copper for forming the conductor loops and to exploit its highly electrical conductivity to great advantage. The resistance value of copper, which is considerably lower than that of steel, permits the introduction of small wire cross-sections, which in combination with the partly stepped strand structure permit the conductor loops favorably to bend as it is desired. The loops may also later be built into already finished conveyor belts which are in operation. To this end, it is merely necessary at certain areas to withdraw the cover plate and to cover these areas after insertion of the loops with a new cover plate, whereupon these areas are post-vulcanized.

Referring now more specifically to FIGS. 3 – 5, the conveyor belt illustrated therein represents a so-called steel cable conveyor belt which in a belt body 4 of rubber or rubber-like elastomers comprises strength carriers which in longitudinal direction of the belt and in space relationship to each other comprise continuous wires or wire cables 5 as conveying the driving and pulling forces exclusively. In that lower belt portion which faces away from the conveyor belt there is imbedded a plurality of conductor loops 6 which are closed in themselves and are in spaced arrangement distributed over the length of the conveyor belt. Opposite to the bottom side of the belt and slightly spaced therefrom there is provided one or more scanning heads 7, which are distributed over the length of the conveyor path for scanning the non-damaged or damaged condition of the conductor loops 6, preferably in an electric inductive manner, and for reporting or conveying in a continuous manner the scanned condition to a nonillustrated control relay or signal emitter through the intervention of a connected circuit 8. As long as all conductor loops 6 are closed in themselves without interruption and respectively form an electric oscillation circuit, the circuit 8 will not be influenced. If, however, a conductor loop is interrupted by a break, slit, or another damage in the belt body 4, these oscillation circuits are disturbed, so that a control pulse will be initiated by means of the scanning head 7.

The conductor loops 6 are preferably formed by tinplated round copper wire having a diameter of approximately 0.05 mm. In conformity with the diagram illustrated in FIG. 5, six loosely twisted outer strands 26 respectively composed of three individual strands 16 are twisted together with a similarly made core strand 36. Each individual strand 16 is composed of a greater number, for instance 31 thin round wires. The finish-twisted cable 6a thus contains $3 \times 31 + 6 \times X (3 \times 31) = 651$ individual wires. Its diameter may amount to approximately 2.3 mm. The installation-ready loops 6 are obtained by connecting in an endless manner the cable 6a cut to an appropriate length, and subsequently brass plating the same.

The conductor loops according to the present invention combine the high electric conductivity of the copper wire with a very good pliability and flexibility without, on the other side, to offer too high a resistance against entering foreign bodies. The conductor loops thus assure a mutual influence within the electric checking system, which influence is effective under all circumstances. In view of their good dynamic behavior, the said conductor loops remain for practical purposes in their original undamaged condition during use of the conveyor belt. An indirect advantage derived from the construction of the strands consists in the possibility of making extremely durable endless connection by splicing the loop ends together which face each other while avoiding disturbing accumulations or thicknesses. The imbedding of the relatively thin-coated light wire bundles in the belt body with adherent binding to the elastomeric material will cause no material difficulties. Inasmuch as the fixing of the conductor loops in the material or fabric in a positive manner is important for the proper function of the safety system, it is suggested, for assuring fabric conditions, to tinplate the individual wires prior to the wires being braided and to brassplate the finished conductor loops which are spliced in an endless manner. To this end, any standard methods may be employed in conformity with the respective available conditions in the shop, as for instance, immersing the wires into a melt of tin, galvanic plating of the loops or the like with brass.

It is, of course, to be understood that the present invention is by no means limited to the specific showing in the drawings, but also comprises any modifications within the scope of the appended claims.

What we claim is:

1. An electric conductor element for insertion into a conveyor belt, for checking possible damage thereto, especially in the form of slits and cracks, which includes a metallic wire cable comprising a plurality of wire strands and being shaped in the form of a loop by having its ends spliced together over a length of from one-twentieth to approximately one-tenth of the circumference of the finished loop, the spliced strand ends being twisted to each other and protruding laterally from the remainder of said conductor element.

2. An electric conductor element according to claim 1, in which the twisted protruding strand ends have a length which counted from the outer circumference of the conductor element amounts to approximately at least the diameter of said conductor element.

3. An electric conductor element according to claim 1, in which at least 10 strands ends protrudcing outwardly from the conductor element are distributed over the total splice length.

4. An electric conductor element according to claim 1, in which the loop-shaped spliced conductor element is brass-plated.

5. An electric conductor element according to claim 1, in which the loop-shaped conductor element comprises a core strand and a plurality of outer strands of round copper wire with said outer strands loosely twisted together about said core strand, said outer strands and said core strand being formed by a three-step twisting operation, and the over-all diameter of said loop-shaped conductor element equalling approximately from 40 to 50 times the diameter of the individual copper wire.

6. An electric conductor element according to claim 5, in which the conductor loop comprises six outer strands respectively composed of three individual strands and surrounding said core strand.

7. An electric conductor element according to claim 6, in which each of said individual strands comprises from 25 to 40 copper wires.

8. An electric conductor element according to claim 5, in which said copper wires are provided with a tin coating.

9. An electric conductor element according to claim 1, in which the loop-shaped conductor element has an outer brass cover.

10. A conveyor belt of elastomeric material, which includes reinforcing strength carriers extending in the longitudinal direction of said belt and spaced from each other in a direction transverse to the longitudinal direction of said belt, and a plurality of loop-shaped conductor elements imbedded in said belt and located in a plane at least approximately parallel to the surface of said belt and in spaced relationship to said strength carriers while being distributed over the length of said belt and spaced from each other in the direction of the length of said belt, each of said loop-shaped conductor elements comprising a core strand and a plurality of outer strands of round copper wire with said outer strands loosely twisted about said core strand being formed by a three-step twisting operation, and the over-all diameter of said loop-shaped conductor element equalling approximately from 40 to 50 times the diameter of the individual copper wire.

* * * * *